T. ALLATT.
TEARING MACHINE.
APPLICATION FILED MAR. 23, 1916.

1,255,123.

Patented Feb. 5, 1918.
10 SHEETS—SHEET 1.

Attest:

Inventor:
Thomas Allatt
by Raegener & Matty Atty's

T. ALLATT.
TEARING MACHINE.
APPLICATION FILED MAR. 23, 1916.

1,255,123.

Patented Feb. 5, 1918.
10 SHEETS—SHEET 2.

Attest:
Inventor:
Thomas Allatt
by Raegener & Matty
Atty's

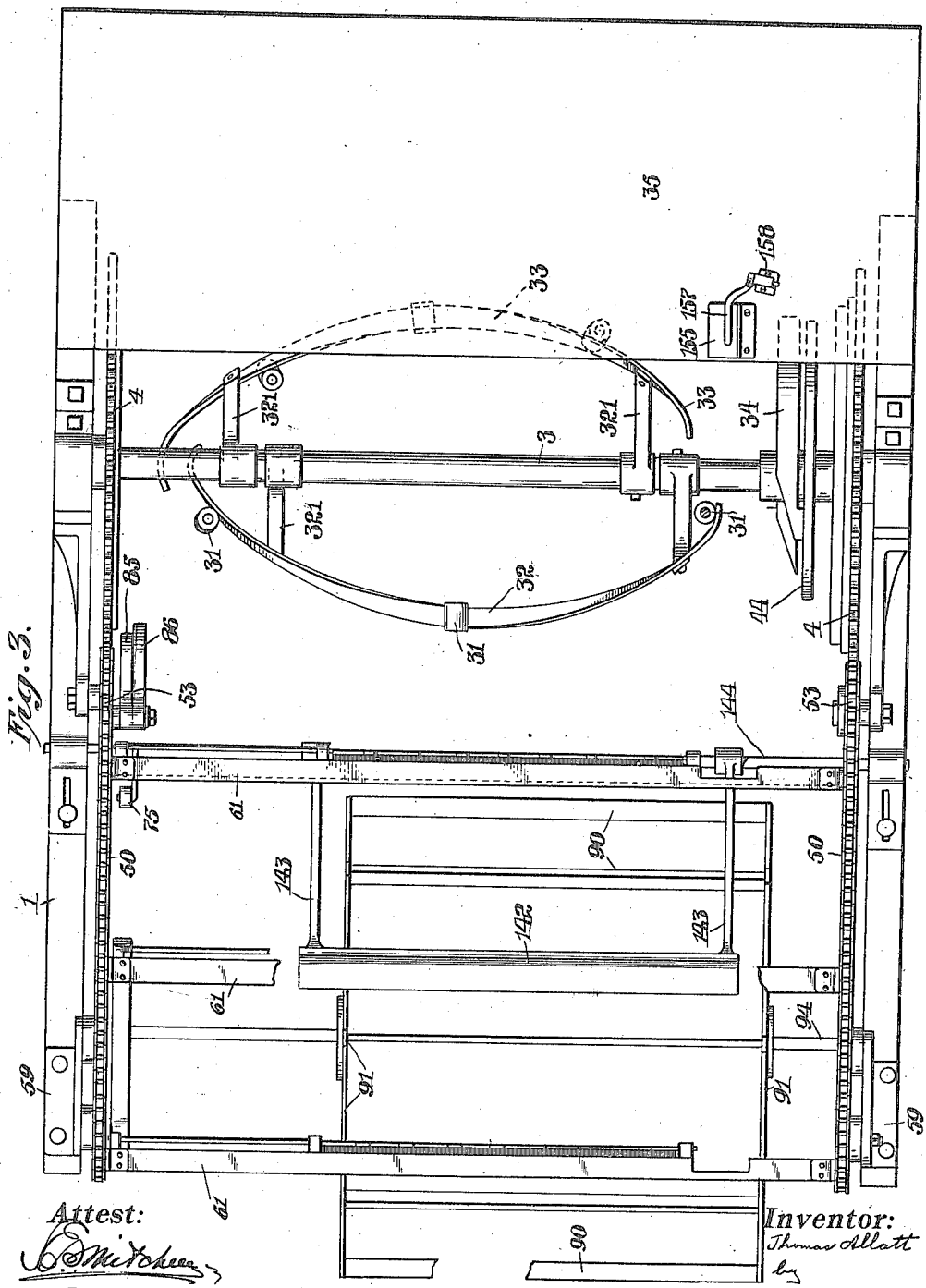

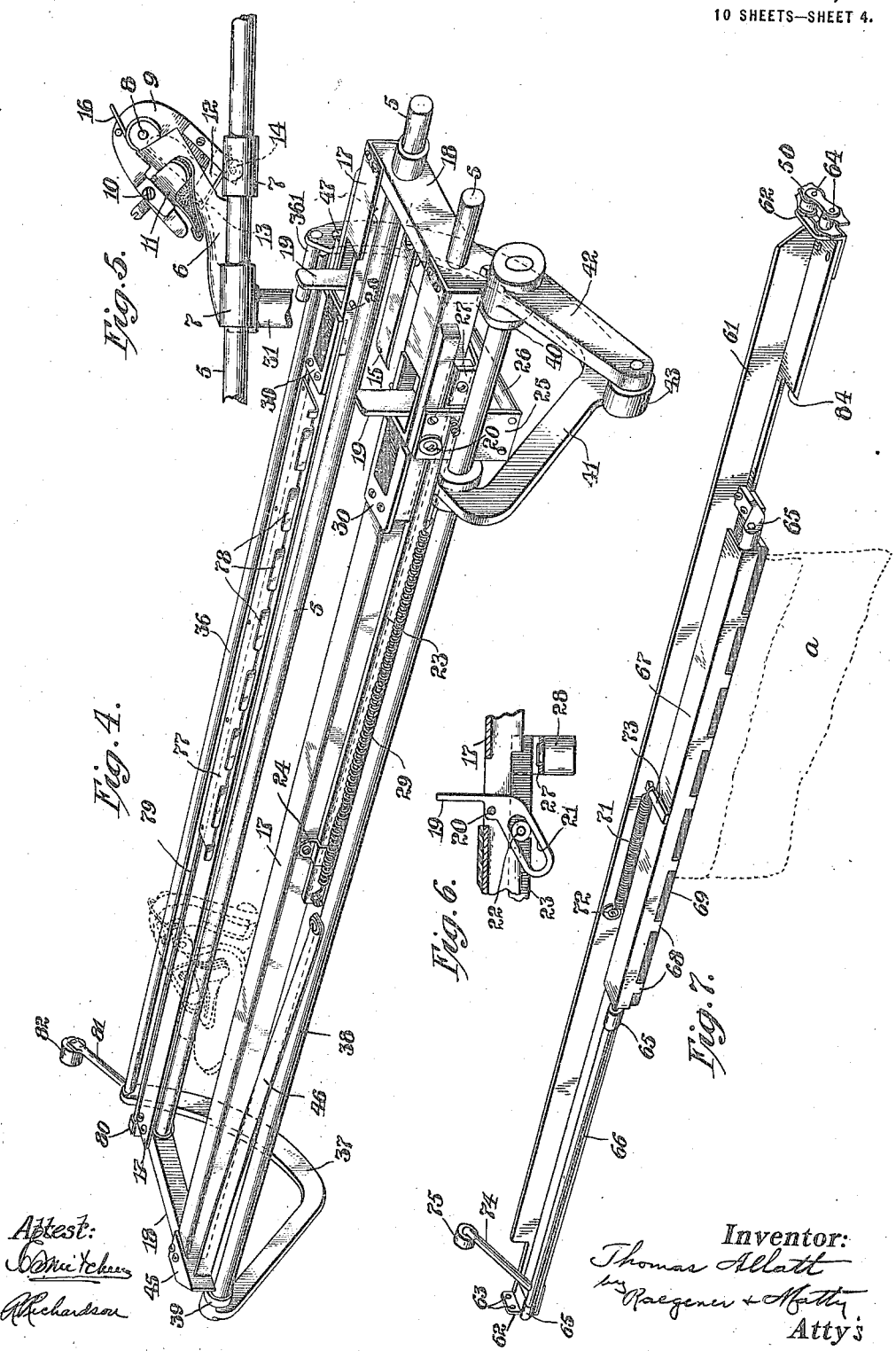

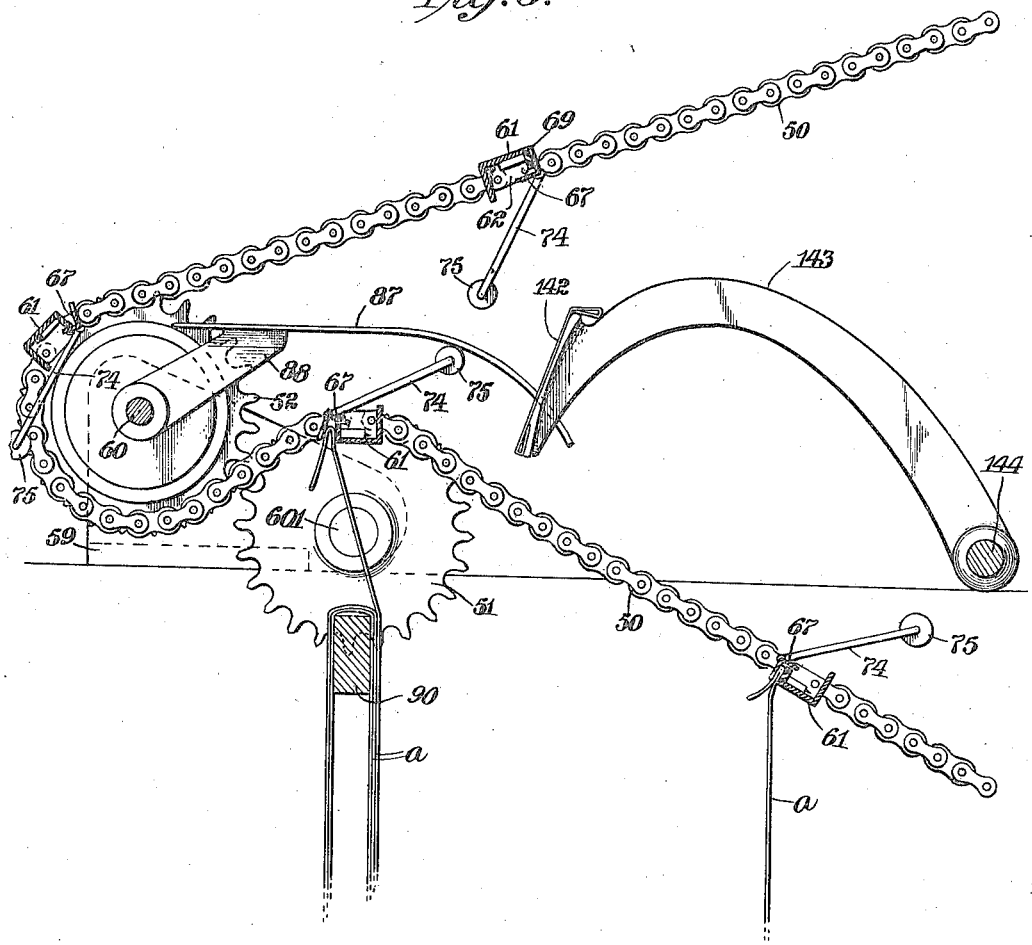

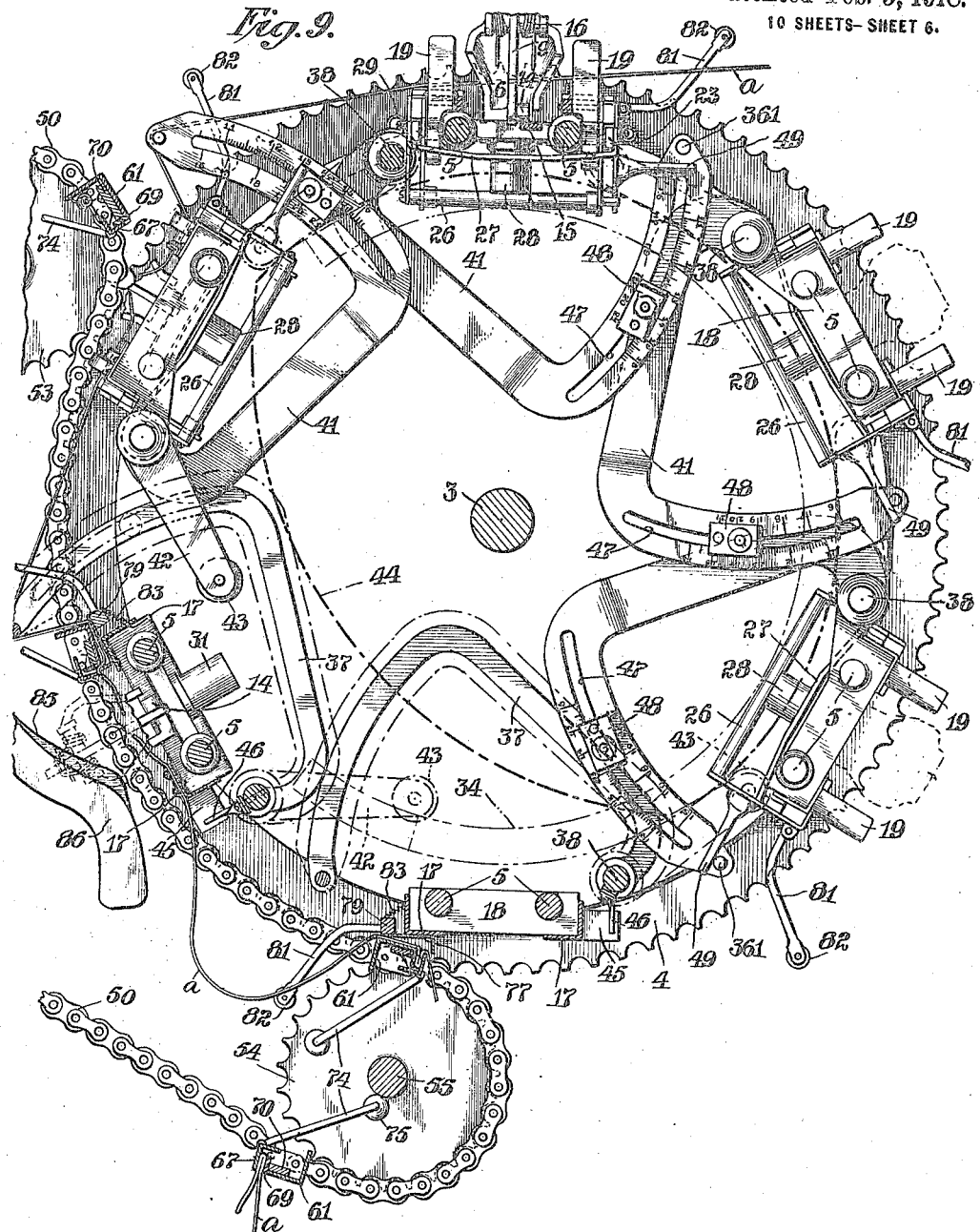

T. ALLATT.
TEARING MACHINE.
APPLICATION FILED MAR. 23, 1916.

1,255,123.

Patented Feb. 5, 1918.
10 SHEETS—SHEET 8.

Attest:

Inventor:
Thomas Allatt
by Raegener & Matty
Attys

T. ALLATT.
TEARING MACHINE.
APPLICATION FILED MAR. 23, 1916.

1,255,123.

Patented Feb. 5, 1918.
10 SHEETS—SHEET 10.

Attest:

Inventor:
Thomas Allatt
by Raegener & Matty
Attys

UNITED STATES PATENT OFFICE.

THOMAS ALLATT, OF NEW BRIGHTON, NEW YORK, ASSIGNOR TO HERRMANN, AUKAM & CO., OF NEW YORK, N. Y., A CORPORATION OF NEW YORK.

TEARING-MACHINE.

1,255,123.  Specification of Letters Patent.  Patented Feb. 5, 1918.

Application filed March 23, 1916. Serial No. 86,273.

*To all whom it may concern:*

Be it known that I, THOMAS ALLATT, a British subject, and a resident of New Brighton, in the county of Richmond and State of New York, have invented a certain new and useful Tearing-Machine, of which the following is a specification.

This invention relates to a machine for tearing cloth, more particularly to a machine designed to tear cloth into small pieces to be used as handkerchiefs.

To the accomplishment of the above objects and to such others as may hereinafter appear, the invention comprises a tearer-drum upon which is mounted a plurality of tearers arranged to tear a long strip of material transversely into a number of relatively small pieces.

The invention further comprises a plurality of adjustable spacers mounted on the tearer-drum between said tearers and adapted to increase the length of the material between adjacent tearers.

The invention further comprises a piling device which removes the severed pieces of material from the tearer-drum after they are torn and piles them in an orderly manner in one place.

The invention further comprises a piling drum which is adapted to collect the severed pieces of material as they are released by the piling device.

The invention further comprises means for turning said piling drum after a certain number of predetermined severed pieces of material have been collected on one of a series of piling bars secured to the circumference of the piling drum.

The invention further comprises means for breaking stray threads connecting adjacent severed pieces of material as they are carried by the piling device.

The invention further comprises means for automatically stopping the machine when the material is not being properly engaged by the tearer-drum.

Referring to the drawings:

Fig. 3 is a plan of the machine with the tearer carriages removed from the tearer drum, the piling drum turning device is also removed together with other parts for clearness of illustration.

Fig. 4 is a detail perspective view of one of the tearer-carriages.

Fig. 5 is a detail view of one of the tearers.

Fig. 6 is a detail view in cross section of one of the gripping-fingers.

Fig. 7 is a detail perspective view of one of the grippers of the piling device.

Figs. 8 and 9 are enlarged views in cross-section of the tearer-drum and piling device with other parts broken away.

Figure 1:
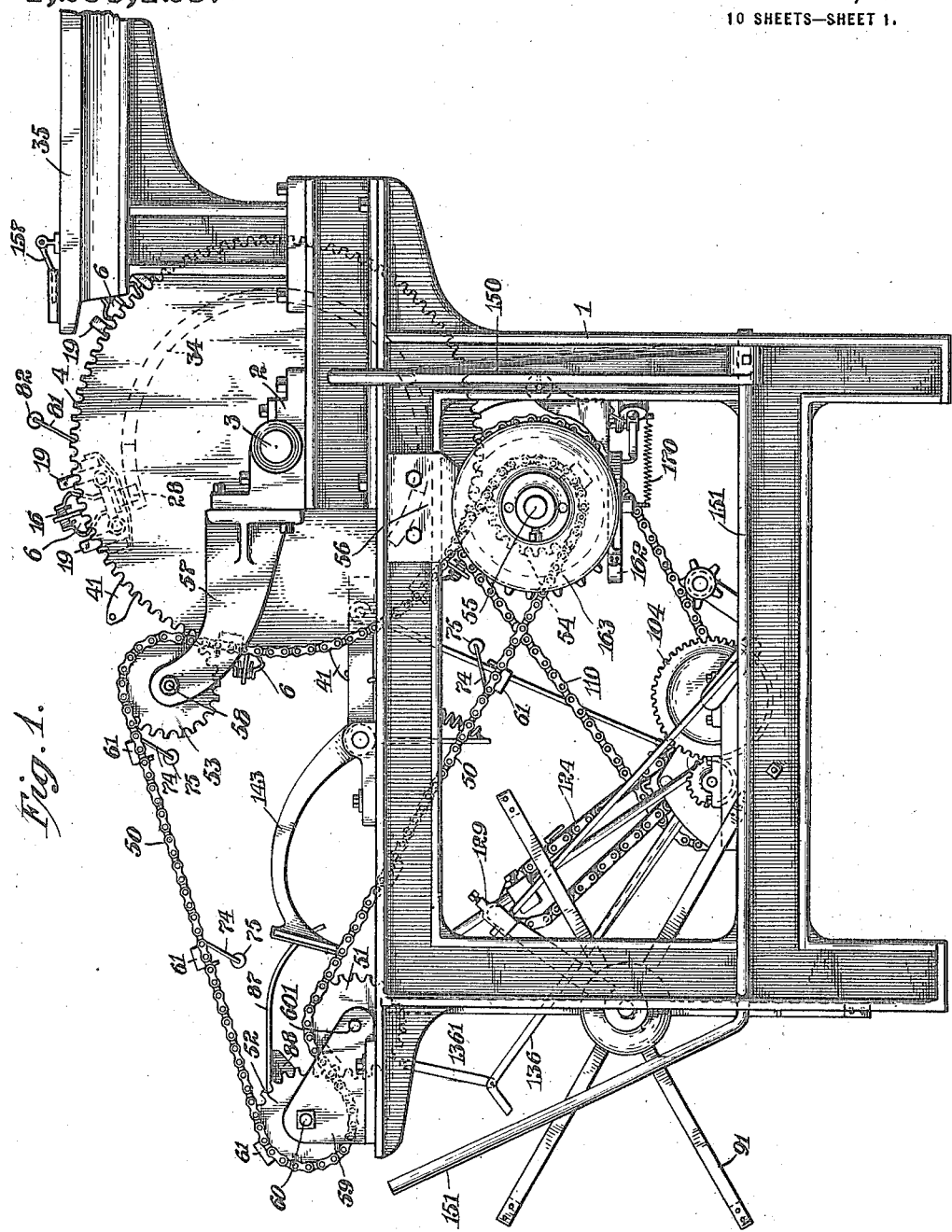
Figure 1 is a side elevation of the right hand side of a tearing machine made in accordance with the invention.

In the drawings, 1 designates the frame of the machine upon which is mounted, in suitable bearings 2, a stationary shaft 3 which supports near each end, adjacent the inner sides of the frame, the large rotatably mounted sprocket wheels 4 which support a series of tearer-carriages, in the present instance six in number, about the periphery thereof to form a tearer-drum.

Each tearer-carriage, one being shown in Fig. 4, is provided with two parallel guide rods 5 the ends of which are secured to the inner sides of the sprocket wheels 4. Upon the guide rods 5 is slidably mounted a tearer comprising an inclined bearing shoe 6, constituting the tearer proper, having sliding bearings 7 through which the guide rods 5 pass, whereby said tearer may slide back and forth over said guide rods.

To the top of the inclined bearing shoe 6 is pivoted, by means of a bearing pin 8, a bell crank lever 9 to the upper arm of which is pivoted, by means of a bearing pin 10, a pad 11, preferably faced with leather or other suitable material. To the lower arm of the bell crank lever 9 is secured a knife 12, the sharp end of which is adapted to project through a hole 13 in the shoe 6. Suitably secured to the end of the lower arm of the bell crank lever 9 is a roller 14 which is adapted to engage a suitable cam plate 15, at certain times to be later described, so as to force the pointed end of the knife 12 slightly beyond the upper working surface of the shoe 6. The knife 12 is normally kept in a retracted position, below the working surface of the shoe 6, through the medium of the coiled springs 16 which force the pad 11 against the working face of the shoe 6.

Upon the outer ends of the guide rods 5 is supported a tearer-frame comprising the longitudinal angle-bars 17 and the transverse angle-bars 18 secured together at their ends, the transverse-angle-bars 18 being provided with suitable holes through which the guide rods pass to support the tearer-frame. The tearer-frame is arranged to be supported, as shown, on the guide rods 5, so as not to interfere with the sliding movement of the tearer, the upper portion of the inclined bearing shoe 6 being permitted to project above the top surface of the tearer-frame.

The tearer-frame is provided at one end with suitable gripping fingers 19 each of which is pivoted by means of a pivot pin 20 to its corresponding longitudinal angle bar 17, the upper side of each angle-bar being cut away to permit the working of the gripping fingers. The lower bent portion of each gripping finger 19 is provided with a slot 21 (see Fig. 6) which is adapted to engage a small roller 22 secured to the inner side of a bar 23 slidably mounted on the longitudinal angle bar 17 by means of a suitable bracket 24 at one end and a bracket 25 at the other end, suitable cross-bars 26 being provided for joining the lower ends of the respective brackets 25 together. The outer ends of the bars 23 are connected by means of a cross-piece 27 having a depending roller 28 (see Fig. 9). Each bar 23 is respectively secured at one end to a spring 29 the other end of which is secured in each instance to the bracket 25, the springs 29 both acting to force the bars 23 to the right to normally hold the gripping finger 19 in closed position against the seat-plates 30 the contact portions of which are preferably faced with rubber or similar material. For purposes of illustration the gripping fingers shown in Fig. 4 are shown in open position.

The tearer-carriages just described are preferably spaced at equal distances about the periphery of the large sprocket 4, and while six of these tearer-carriages are shown a greater or less number can be used depending upon the distance between successive tears.

The bottom of each tearer is provided with a roller 31 which is adapted to engage a curved cam plate 32 secured to the stationary shaft 3 by means of suitable brackets 321, said cam acting to slide the tearer from the extreme right to the extreme left hand side of the tearer-carriage, as the tearer-carriages are rotated in a counter-clockwise direction, the roller 31 of each tearer being adapted to engage a similarly curved cam plate 33 similarly secured to the stationary shaft 3 which acts to slide the tearer from the extreme left to the extreme right hand side of the tearer carriage. Each tearer is successively moved from its extreme right hand position to its extreme left hand position and back again to its original right hand position for every complete rotation of its respective tearer-carriage on the tearer-drum.

As the tearer-carriages are rotated the rollers 28 on the cross-pieces 27 are adapted to successively engage a circular cam plate 34 secured to the stationary shaft 3 to open the gripping fingers 19 by acting against the action of the springs 29 during a certain portion of the rotation of each tearer carriage.

The tearer carriages so far described operate as follows: Material to be torn designated by the letter $a$ is placed or suitably fed over the top of the feeding table 35, suitably supported on the frame of the machine so that the edge of the table will overhang some of the tearer-carriages and be on a level or slightly above the uppermost position of the tearer-carriages. The material $a$ is pulled over the edge of the table and over the top surface of the frame of the tearer-carriage that is adjacent the edge of the table. The material $a$ is held in position on the tearer-carriage by means of its gripping fingers 19 which grip the right hand edge of the material. In this uppermost position of the tearer-carriage its respective tearer, by the action of the curved cam plate 33, is situated at the extreme right hand side of the carriage, in which position the cam plate 15 acting against the roller 14 acts to force the pointed end of the knife 12 slightly beyond the working surface of the shoe 6. As the uppermost tearer-carriage is rotated through the medium of the large sprockets 4, by means to be described later, in a direction away from the table 35, or in a counter-clockwise direction, the circular cam plate 34 acts to release the gripping fingers 19 so that they will grip the edge of the material and hold it in position. On the further rotation of the uppermost tearer-carriage the curved cam plate 32 acts to move the tearer toward the left, the cam plate 15 acting to keep the sharp edge of the knife 12 above the working face of the shoe 6, until the edge of the material held between the gripping fingers 19 has been initially cut. On the further movement of the tearer the cam plate 15 permits the knife 12 to recede, the springs 16 acting to force the pad 11 against the material $a$ on the shoe 6 which acts to tear the material as the tearer is moved along the guide rods 5 by the action of the curved cam plate 32. By the time the tearer has reached the extreme left hand side of the tearer-carriage the material has been torn in a transverse direction, the tearer being returned in its rotation to the extreme right of the tearer-carriage in position to again tear the material transversely, by the action of the curved cam plate 33. After the tearer has reached the extreme left hand side of the tearer-carriage and after the material has been torn transversely the circular cam plate 34 acts to engage the roller 28 to raise the gripping fingers 19, so as to release the piece of material after it is torn.

From the above description it will be seen that as the tearer-carriages are rotated, in the operation of the machine, they will each in turn, as they rise to their uppermost position and pass by the edge of the feeding table, engage the material, the gripping fingers 19 of each tearer-carriage acting to grip the edge of the material during the time its respective tearer is tearing the material, after which said gripping-fingers are released to drop the torn pieces of material. The operation just described is continuous and the distance between successive tears is dependent upon the spacing apart, on the circumference of the large sprockets 4, of adjacent tearer-carriages.

In order to increase the distance between successive tears, without changing the position and number of tearer-carriages on the tearer-drum, each tearer-carriage is provided with an adjustable spacer as shown in Fig. 4. In the present instance, the spacer comprises a spacing rod 36, which extends from the gripping fingers 19 to the opposite end of the tearer-frame. The outer end of the spacing rod 36 is secured to one end of a bent arm 37, the other end of said arm being secured to the end of a shaft 38 rotatably mounted on the tearer-frame by means of suitable brackets 39 and 40. The inner end of the spacing rod 36 is secured to one end of a bent adjusting arm 41, the other end of which is secured to the shaft 38. To the inner end of the shaft 38 is secured one end of a lever 42, having at its other end a roller 43, which is adapted to engage a circular cam 44 secured to the stationary shaft 3 (see Fig. 3). Suitably secured at one end to a bracket 45 fastened on the outer end of the tearer-frame is a flat twisted spring 46 the other end of which is secured to the shaft 38, said spring acting to turn said shaft to raise the spacing rod 36 above the top of the tearer-frame. The bent portion of the adjusting arm 41 adjacent the end of the spacing rod 36 is provided with a curved slot 47 in which is secured an adjustable stop 48 which is adapted to engage a stop 49 secured to the side of the tearer-frame as shown in Fig. 9.

From the above description it will be seen that the extent of upward movement of the spacing rod 36 is dependent upon the position of the adjustable stop 48 in the slot 47, the twisted spring 46 acting to force the spacing rod 36 upward until the adjustable stop 48 hits the stop 49 on the tearer-frame, except at such times when the circular cam 44 is acting against the roller 43 to force the spacing rod 36 into retracted position.

When it is desired to use the spacer, that is when it is desired to increase the distance between successive tears, or, the length of the pieces of material to be torn, the adjustable stop 48 is set on every adjusting arm 41 to permit of the spacing rod 36 extending a certain fixed distance above the top of each of the carriage-frames.

The operation of the spacer is as follows: By referring to Fig. 9 it will be seen that the spacer attached to the uppermost tearer-carriage is held by the action of the circular cam 44 on the roller 43 in retracted position, so that the spacer-rod 36 is below the top surface of the tearer-frame. The circular cam 44 acts to hold the spacer-rod 36 in retracted position until the uppermost tearer-carriage under consideration, has rotated, in the operation of the machine, to permit the gripping fingers 19 to grip the edge of the material $a$, after which time the circular cam 44 releases the roller 43 and the action of the twisted spring 46 forces the spacer-rod 36 upward, above the surface of the tearer-frame, until the adjustable stop 48 hits the stop 49. When the spacer is permitted to assume its upward or raised position the spacer-rod 36 draws the material $a$ upward, thereby increasing the length of the material between it and the next succeeding tearer-carriage, whose gripping fingers 19 do not operate to grip the fabric until after the spacer under consideration has assumed its raised position. When in the operation of the machine the tearer, of the tearer-carriage under consideration, has moved to the extreme left and the material has been torn transvesely, the circular cam 44 is arranged to again engage the roller 43 so as to return the spacer into its retracted position. The spacer is then held in retracted position until the tearer-carriage under consideration has again passed under the feed table and its gripping fingers 19 have again engaged the edge of the material, after which the circular cam 44 permits the spring 46 to act to again force the spacing rod 36 of the spacer upward as before described. Situated on top of the right hand end of the spacing-rod 36 is a short bar 361 also secured to the end of the adjusting arm 41. The object of the short bar 361 is to raise the edge of the material a little above the spacing-rod 36 to compensate for the extra amount of material taken up by the gripping fingers. The operation of each spacer situated on each of the tearer-carriages is continuous, the action of the spacer in each instance regulating the distance between successive tears. If desired, the spacers can be set in an inoperative position by moving the adjustable stops 48 to the top of the curved slots 47.

Instead of dropping the torn pieces of material upon the floor under the tearer-carriages after they have been torn and released by the gripping fingers, as above described, a suitable piling device is provided for engaging each piece of torn material and piling it, together with pieces of previously torn material, in an orderly manner, so that the torn pieces can be removed from the machine in regularly formed piles.

In the present instance the piler comprises two endless sprocket chains 50 situated on opposite sides of the machine, each chain being arranged to engage, for a portion of its length, a section of the teeth on the large sprocket 4 of the tearer-drum. Each sprocket chain 50 is supported on opposite sides of the machine upon a series of four sprockets 51, 52, 53 and 54. The sprockets 54 are each rigidly secured near the opposite ends of a power shaft 55 which is rotatably mounted in suitable brackets 56 secured to the opposite sides of the frame. The sprockets 53 are situated on opposite sides of the machine and are rotatably mounted in axial alinement upon the ends of the brackets 57 mounted in each instance upon the frame of the machine. The sprockets 53 are in each instance rotatably mounted upon the ends of the brackets 57 by means of short studs 58, it not being desirable to mount the sprockets 53 upon a shaft that extends all the way across the machine, as the shaft would interfere with the operation of the machine. The sprockets 51 and 52 are situated adjacent each other on opposite sides of the machine, suitable brackets 59 secured in each instance to the frame of the machine, being provided upon which the sprockets 51 and 52 are rotatably mounted in axial alinement with the sprockets 51 and 52 on the other side of the machine by means of short studs 60 and 601.

The chains 50 are adapted to carry, in the present instance, six gripping-carriages which correspond to the number of tearer-carriages mounted on the tearer-drum.

Each gripping carriage, one being shown in Fig. 7, is provided with an angle bar 61 the lower side of each end of which is provided with a bracket 62 having two small holes 63 arranged to engage elongated link pins 64 in oppositely situated links in the chains 50. The lower side of the angle-bar 61 is provided, in the present instance, with three brackets 65 which rotatably support a rod 66 upon which is secured a gripper 67. In the present instance, the gripper 67 is made in the shape of an angle bar and is provided along the edge of one side with a plurality of equally spaced gripper-teeth 68, which are adapted to engage a gripper-back 69, in the present instance made of rubber secured in an upright position upon the lower side of the angle-bar 61 by means of a wooden block 70. The gripper-teeth 68 are normally held in position against the gripper-back 69 by the action of a coiled spring 71, one end of which is secured to the upper side of the angle bar 61, by means of a screw 72 the other end of the spring being secured to the overhanging end of a stud 73 secured to the top of the gripper 67. To the outer end of the rod 66 is secured one end of an arm 74 having at its free end a roller 75 which is adapted at certain times to be operated to raise the gripper-teeth 68.

The gripping-carriages on the chains 50 together with the tearer-drum are rotated through the medium of a pulley 76 secured to one end of the power shaft 55.

The gripping-carriages are spaced at suitable distances apart, along the chains 50, to correspond with the distances the tearer-carriages are set apart, about the circumference of the tearer-drum, so that the gripper 67 on each of the gripping-carriages will engage a ridge plate 77 situated on the upper side of the tearer-frame of each of the tearer-carriages.

The ridge plates 77 are made substantially the same length as the grippers 67 and each one is provided with upwardly projecting teeth 78 which are adapted to register with the spaces between the gripper-teeth 68 on the grippers 67, it being noted that the teeth 78 on the ridge plates 77 are of less width than the spaces between the gripper-teeth 68 on the grippers 67.

Each ridge plate 77 is secured, along one side, to a bar 79 which is pivotally supported at both ends in suitable brackets 80 secured to the tearer-frame. The outer end of the bar 79 is secured to one end of an arm 81 having at its free end a roller 82. The ridge plate 77 normally lies flat against the top surface of the tearer-frame in which position it is held through the medium of a spring 83, except at such times when the roller 82 is operated to raise the toothed side of the ridge-plate.

It is to be noted that the lower inner side of the angle-bar 61 of the gripping-carriage adjacent the inner bracket 65 is cut away as shown at 84 so as to afford ample space for the operation of the gripping-fingers 19 when in the operation of the machine the gripping carriage rests upon the tearer-frame over the ridge-plate 77.

From the above description it will be seen that the material *a* as it is drawn over the top of the tearer-frame, of each of the tearer-carriages, it is also drawn over the upwardly projecting teeth 78 of its respective ridge plate 77. As each tearer-carriage moves from its uppermost position, and after its respective gripping fingers 19 and its respective spacer has operated, as before described, the tearer-carriage under consideration moves to a position opposite the sprockets 53 where the chains 50 leave the sprockets 53 and engage the large sprockets 4 of the tearer-drum. As the chains 50 leave the sprockets 53 one of the gripping-carriages, before described, secured to the chains 50, is adapted to engage the top of the ridge plate 77, situated on the tearer-frame of the tearer-carriage under consideration, back of the upwardly projecting teeth 78. Between the time the tearer-carriage under consideration has moved from its uppermost position to a position opposite the sprockets 53 its respective tearer has already started to tear the material by the action of the curved cam plate 32, but this tearing action of the tearer does not affect the relative position of the material which is still held in position by the gripping-fingers. The gripping-carriage does, however, as it passes the sprockets 53, engage the material over the ridge plate 77 on the tearer-frame of the tearer-carriage under consideration before its respective tearer has been moved far enough to complete the tearing operation.

Shortly after the tearer-carriage under consideration has passed the sprockets 53, and one of the gripping-carriages has engaged said tearer-carriage, as above described, the roller 75 on the arm 74 engages a cam plate 85, secured to the left hand side of the frame of the machine, which acts to lift the teeth 68 of the gripper 67, against the action of the spring 71, away from the surface of the gripper-back 69. On the further movement of the tearer-carriage under consideration, and just after the cam plate 85 has operated to lift the teeth of the gripper 67, the roller 82 on the arm 81 engages a cam plate 86, also secured to the left hand side of the frame of the machine adjacent to the cam plate 85, which acts to lift the teeth 78 of the ridge-plate 77, against the action of the spring 83, to force the material *a* lying over the toothed edge of the ridge-plate 77, up against the face of the gripper-back 69. After the toothed edge of the ridge-plate 77 has forced the material *a* up against the gripper-back 69 the cam plate 85 acts to release the roller 75 and the action of the spring 71 forces the teeth 68 of the gripper 67 up against the material *a*, between the teeth 78 of the ridge-plate 77, securely holding the material against the gripper-back 69. After the cam plate 85 has acted, as before described, to permit the gripper 67 to hold the material *a* against the gripper-back 69 the cam plate 86 acts to release the roller 82 and the action of the spring 83 forces the ridge-plate 77 back upon the surface of the tearer frame, the teeth 78 no longer acting to hold the material *a* against the gripper-back 69.

In the further movement of the tearer-carriage under consideration and after its respective gripper has been operated, as before described, to securely hold the material *a* against the gripper-back 69, the tearer-carriage and its respective gripper moves to a position opposite the sprockets 54 by which time its respective tearer has moved far enough to completely tear the material transversely, and its respective gripping-fingers have subsequently been raised, after the material has been completely torn transversely, so as to release the edge of the material.

When the tearer-carriage under consideration, together with its respective gripper has come to a position opposite the sprockets 54 the chains 50, which carry the gripper, disengage the large sprockets 4, of the tearer-drum, and engage the teeth of the sprockets 54. In the further movement of the tearer-drum the chains 50 carry the gripper holding the severed piece of material away from the tearer-carriage, about the periphery of the sprockets 54. Just previous to the time the gripper, under consideration, comes to a position opposite the sprockets 54 the spacer on its respective tearer-carriage is engaged by the circular cam 44 and forced into retracted position.

In the further operation of the machine and after the gripper, of the respective tearer-carriage under consideration has started on its movement about the circumference of the sprockets 54, the tearer-carriage under consideration, with its gripping fingers held in open position by the circular cam plate 34 and its spacer held in retracted position by the circular cam 44, moves to its uppermost position, where it is again operated as before described.

After the gripper has left the tearer-carriage under consideration, and passed around the periphery of the sprockets 54, the chains 50 carry the gripper, which still holds the severed piece of material, in the further operation of the machine, until the gripper reaches a position adjacent the sprockets 51 where the roller 75 on the arm 74 of the gripper engages a suitable cam 87 supported upon a suitable bracket 88 secured to the stud 60 of the left hand sprocket 52, which acts to release the severed piece of material from the gripper and drop the same. After the gripper under consideration has dropped the severed piece of material and passed over the sprockets 51, the chains 50 also carry the gripper around the sprockets 52 back over the sprockets 53, where as before described it again engages the tearer-carriage, formerly under consideration, as before described, when the operation is repeated.

In the present instance, below the sprockets 51 is situated a piling-drum which consists of six equally spaced piling-bars 90 the ends of which are secured to the sides of the piling-drum each of which consists of six radial spokes 91 mounted upon a flanged sleeve 92. The piling drum is rotatably mounted in bearing brackets 93, secured to opposite sides of the frame, which rotatably engage the outer ends of short shafts 94 the inner ends of which are secured to the flanged sleeves 92 on the sides of the piling-drum.

When the piling-drum is at rest its uppermost piling-bar 90 is situated, in the present instance, directly underneath the cam plate 87 in line with the short studs 601 and a short distance below the highest point reached by the grippers as they pass over the spockets 51, in which position the cam 87 acts to release the severed pieces of material a so that they will fall across and be held by the piling-bar 90 as shown in Fig. 8. It will be noticed, by referring to this figure, that the cam 87 does not act to release the severed piece of material until the end held by the gripper has passed over the top of the piling-bar, under consideration, thereby insuring the severed piece of material, when it is released, falling astride the piling-bar.

Each piling-bar 90 is adapted to hold, in the present instance, approximately fifty pieces of severed material, and when this number in the operation of the machine has accumulated on the uppermost piling-bar, the piling-drum is rotated, by means to be described later, to bring the adjacent piling-bar into position to catch and hold the succeeding pieces of severed material as they are released by the grippers. When in the operation of the machine one or more of the piling-bars have been filled and moved forward the pile of severed pieces are removed by hand so as to leave the piling-bars free to be again filled in the rotation of the piling drum.

The piling drum is rotated at certain predetermined periods, previously referred to through the medium of a ratchet wheel 95 secured to one of the shafts 94. The ratchet wheel 95 is adapted to be engaged by a pawl 96 mounted on a lever 97 one end of which is secured to a sleeve 98 loosely mounted on the shaft 94, the other end of the lever 97 is provided with a pivoted bearing 98′ in which is adjustably secured one end of a rod 99, the other end of which is pivotally mounted on the end of a crank 100 secured to the end of a shaft 101 mounted in the bearings 102 secured to the bracket 103 which is secured to the frame of the machine. Upon the shaft 101 is loosely mounted a gear 104 which is secured to one side of a ratchet wheel 105 also loosely mounted on the shaft 101. The gear 104 is adapted to engage a small gear 106 secured near one end of a shaft 107 mounted in bearing 108 secured to the frame 103. The other end of the shaft 107 is secured to a sprocket 109 which is adapted to engage a sprocket chain 110 which also engages a sprocket 111 secured to one side of the driving pulley 76. Secured to the shaft 101 is a sleeve 112 having an integral arm 113 to the free end of which is pivoted a pawl 114 which is adapted to engage the ratchet wheel 105.

In the present instance the pawl 114 is provided with a hooked shaped member 115 which is adapted to engage the end of a locking pin 116 slidably mounted in a bracket 117 and held in locked position by means of a spring 118. When in the operation of the machine the locking pin 116 is withdrawn so as to disengage the hooked shaped member 115 of the pawl 114 a spring 119, secured to the hooked shaped member and to the sleeve 112, draws the edge of the pawl 114 into locking engagement with one of the teeth of the ratchet wheel 105, thereby rotating the shaft 101 which acts through the rod 99 and the pawl 96 to turn the piling drum a portion of a revolution for each complete rotation of the shaft 101.

The teeth on the ratchet wheel 95 are made to correspond with the number of piling-bars 90 on the piling-drum, so that every complete revolution of the shaft 101 which operates to advance the ratchet wheel 95 one tooth, also advances the piling-drum to bring the next succeeding piling-bar into its uppermost position to receive the severed pieces of material as before described.

As soon as the locking pin 116 has been withdrawn, so as to permit the pawl 114 to engage the ratchet wheel 105 and turn therewith, the locking pin 116 is released, so that when the shaft 101 has made one complete revolution the end of the locking pin 116 will engage the hooked shaped member 115 of the pawl 114 and stop the rotation of the shaft 101. In order to permit the teeth of the ratchet wheel 105 to slip by the pawl 114 the same is pivoted on a pivot pin 120 which slides in an elongated slot 121 in the end of the arm 113. The elongated slot 121 however is not of sufficient length to prevent the spring 119 moving the pawl 114 into locked position with the ratchet wheel 105 when in the operation of the machine the locking pin 116 is withdrawn.

The locking pin 116 is provided with a short stud 122, secured thereto intermediate of its length which is adapted to be engaged by a small cam 123, mounted on a sprocket chain 124 which passes around small sprockets 125 and 126. The sprocket 125 is rotatably mounted on a shaft 127 on the bracket 117 adjacent the locking pin 116 so that the cam 123 will engage the stud 122 to withdraw the locking pin 116 as the cam 123 carried by the sprocket chain 124 passes around the sprocket 125. The sprocket 126 is rotatably mounted on a short stud 128 secured to a sleeve 129 adjustably mounted on the rod 130 one end of which is secured to the bracket 117 and the other end of which is connected to the frame of the machine.

Figure 2:
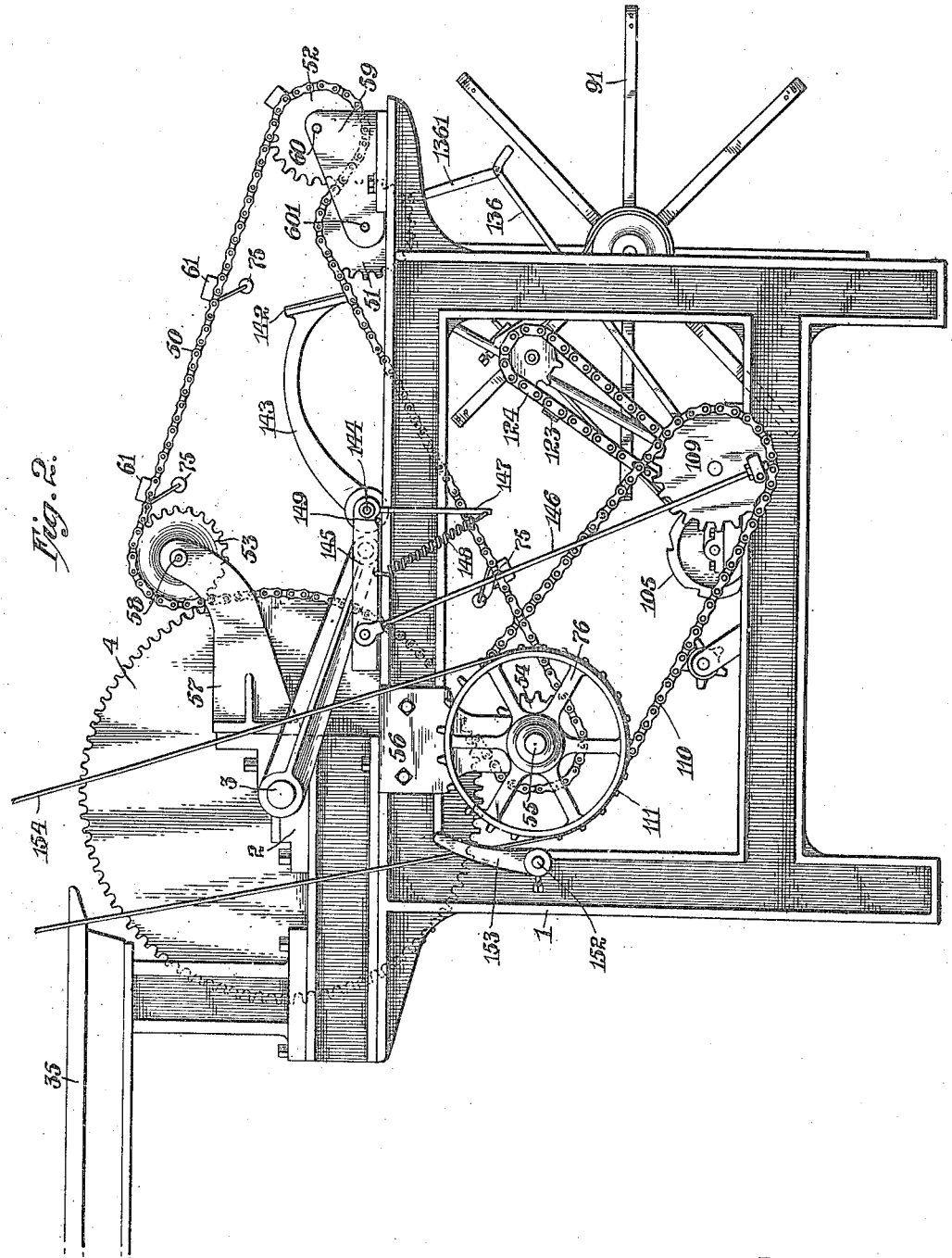
Fig. 2 is a side elevation of the left hand side of the machine.
Figure 10:
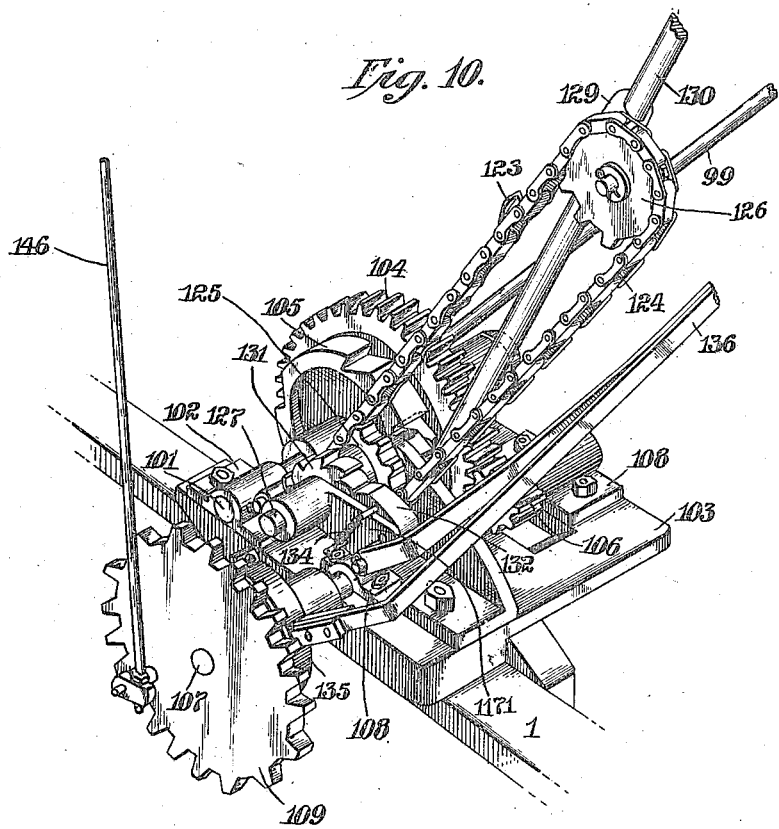
Fig. 10 is a perspective view of the piling drum turning device.
Figure 11:
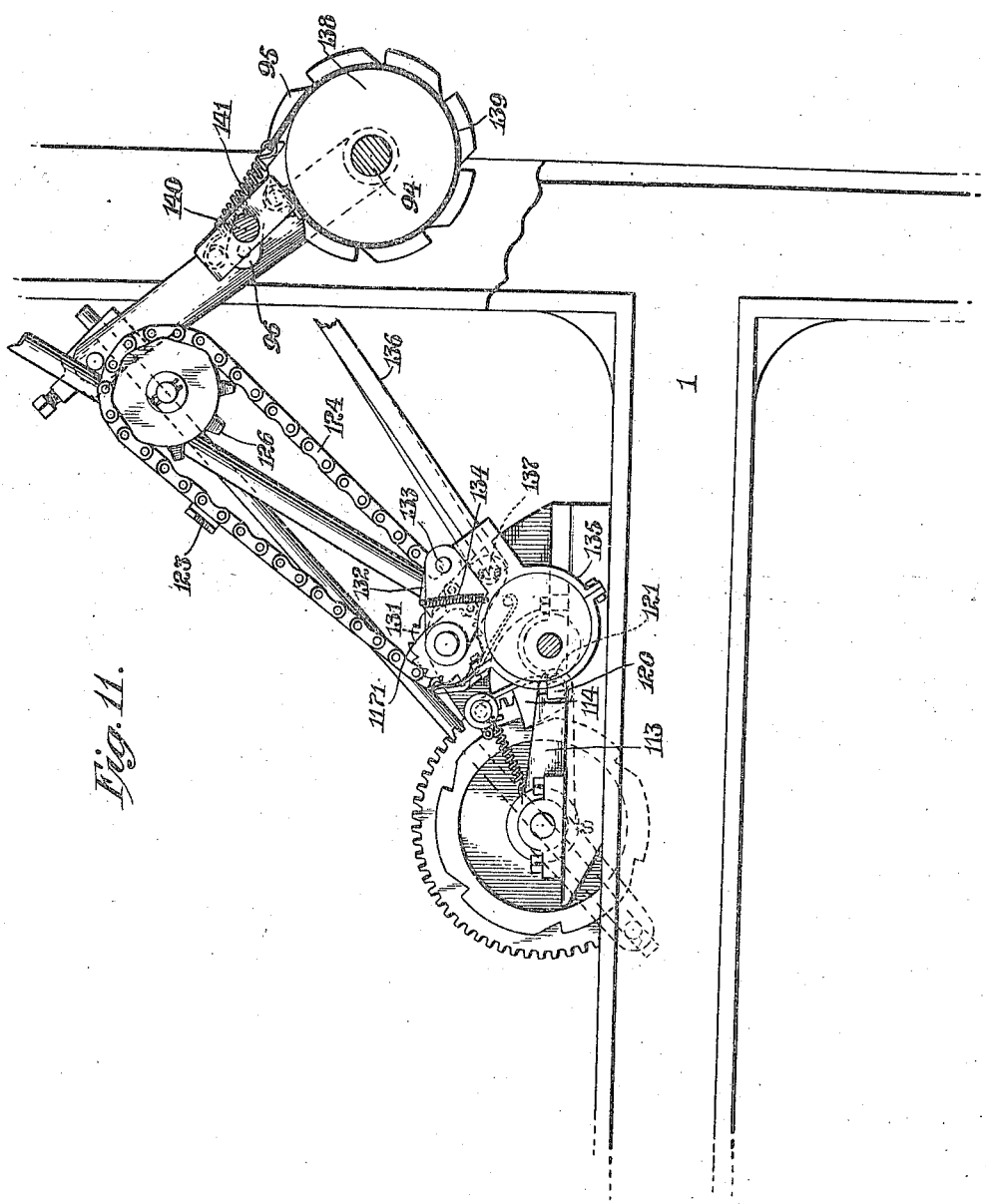
Fig. 11 is a side view of the turning device.
Figure 12:
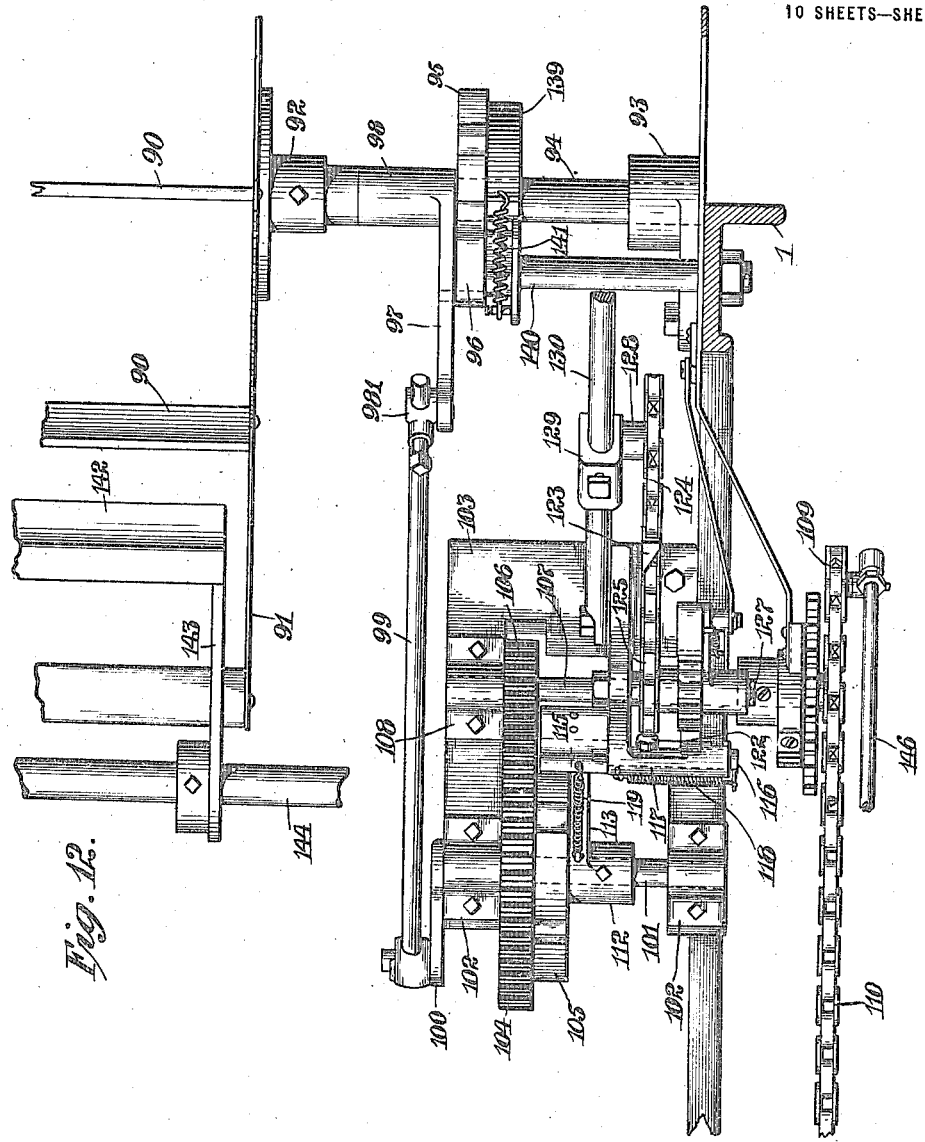
Fig. 12 is a plan of the turning device showing a portion of the piling drum.
Figure 13:
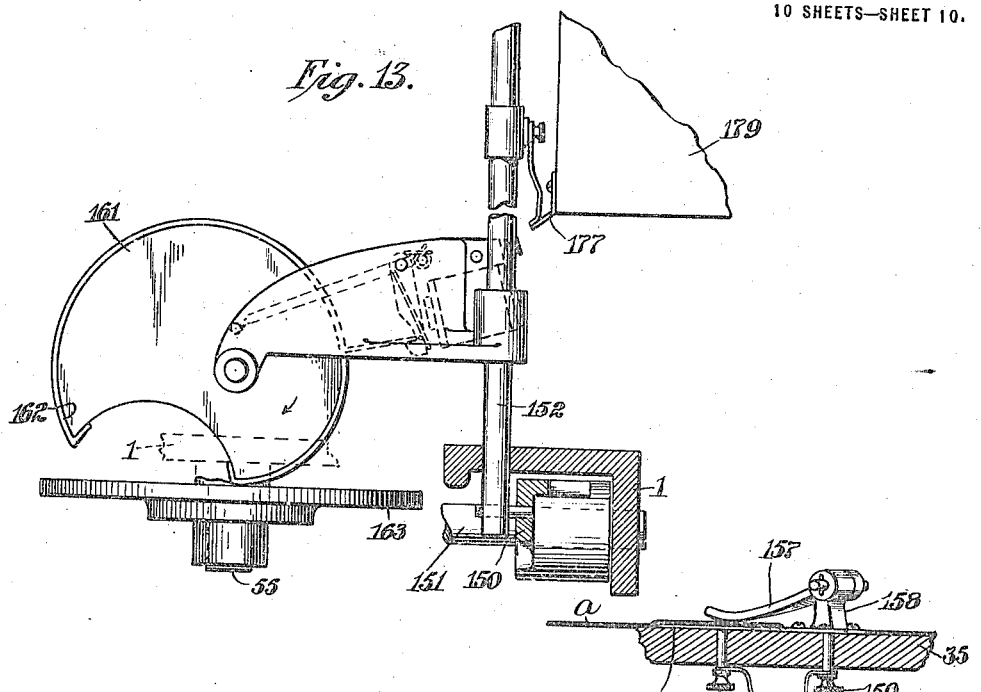
Fig. 13 is a plan of the automatic stop.
Figure 14:
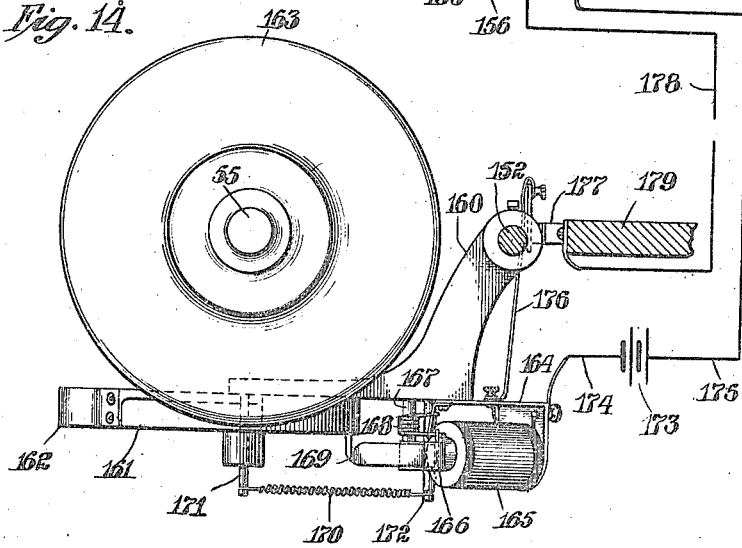
Fig. 14 is a side view of the automatic stop.

Suitably secured to the shaft 127 adjacent the gear 125 is a ratchet wheel 131 which is adapted to be engaged by a pawl 132 pivoted on a pin 133 secured to the swinging bracket 1171. The pawl 132 is kept into engagement with the ratchet wheel 131 by means of a spring 134 secured to the swinging bracket 1171. The pawl 132 is operated to engage the ratchet wheel 131 to turn the shaft 127 and with it the sprocket chain 124 through the medium of an eccentric 135 secured to the shaft 107 adjacent the sprocket 109. The pawl 132 is connected to the eccentric 135 through the medium of a split bar 136 one arm of which is connected to the eccentric and the other arm to a pin 137 secured to the lower side of the pawl. The outer end of the split bar 136 is pivoted to a link 1361 pivoted to the frame as shown in Fig. 2.

From the above it will be seen that every complete revolution of the sprocket 109 will operate the eccentric 135 to actuate the pawl 132 through the medium of the split bar 136 to turn the shaft 127 a distance equivalent to one tooth on the ratchet wheel 131 so as to advance the sprocket chain 124 a distance equivalent to one link thereof. It will also be seen that if there are fifty links in the chain 124 the sprocket 109 will have to be rotated fifty times immediately after the cam 123 engages the stud 122 to release the locking pin 116 before the cam 123 will again release the locking pin.

The sprocket 111 which drives the sprocket 109 through the medium of the chain 110 is designed to give, in the present instance, six complete revolutions to the sprocket 109, to one complete revolution of the tearer-drum, the sprocket 109 being rotated one complete revolution for every tearer-carriage on the tearer-drum every time the tearer-drum is rotated one complete revolution.

From the above description it will be seen that when in the operation of the machine fifty severed pieces of material have been piled upon one of the piling bars 90, the cam 123 on the chain 124 will act to withdraw the locking pin 116 and permit the shaft 101 to make one complete revolution thereby advancing the next succeeding piling bar 90 on the piling drum into its uppermost position to receive the next succeeding fifty pieces of severed material.

If it is desired to increase or decrease the number of severed pieces of material collected on each of the piling bars 90, it is only necessary to change the number of links in the chain 124 so that the number of links will correspond with the number of severed pieces of material to be collected on each of the piling-bars.

In order to retain the piling drum in position after it has been rotated as before described a suitable friction brake is provided for accomplishing this purpose. In the present instance the friction brake consists of a wheel 138 secured to the shaft 94 said wheel being adapted to be engaged by a band 139 one end of which is secured to a post 140 secured to the frame of the machine, the other end of the band 139 being connected to the post by means of a spring 141.

After the grippers leave the tearer-drum one after the other to carry the several pieces of material to the piling drum, it sometimes happens that stray unsevered threads connect the severed pieces of material carried by adjacent grippers. In order to break these threads there is provided a chopper which consists of a chopping plate 142 secured to curved arms 143 the ends of which are secured to a shaft 144 rotatably mounted on the sides of the frame. To one end of the shaft 144 is loosely secured one end of a link 145, the other end of which is pivoted to one end of a rod 146 the other end of which is pivoted to the sprocket 109. Suitably secured to the shaft 144 is one end of a rod 147 to the other end of which is secured one end of a spring 148 the other end of which is secured to the link 145. The end of the shaft 144 is provided with a pin 149 which engages the side of the link 145.

The chopping plate 142 is arranged to operate adjacent the uppermost piling bar 90, as shown in Fig. 8, so that the chopping-plate 142 will operate to break any stray threads connecting adjacent severed pieces of material carried by the grippers before the severed pieces of material are piled upon the piling drum. The chopping plate 142 is adapted to move downward and back to raised position between adjacent grippers as soon as each gripper has passed over the gears 51, by the action of the sprocket 109 which makes one complete revolution for every piece of material that is severed.

If by chance the chopping plate 142 should strike the piling drum as it is turning the spring 148 will give and no damage will be done.

In order to start and stop the machine a suitable hand lever 150 secured to a rod 151 pivoted to the frame is provided. The lever 150 is pivotally secured to one end of a shifting rod 152 the other end of which is secured to short arms 153 adapted to engage the opposite sides of the belt 154. The wheel 76 before referred to is made up of two wheels, one of which is tight on the shaft 55 and the other loose on said shaft. So it will be seen that when the shifting rod 152 is moved the belt 154 can be shifted to either the fast or loose wheel to start or stop the machine, which can be accomplished by pulling either the lever 150 or the extended portion of the rod 151.

If, in the operation of the machine, the material $a$ as it leaves the feed table 35 is not kept in line so as to be properly engaged by the gripping-fingers 19 of the tearer-carriages, the material will not be evenly torn by the tearers, and if the material is not engaged by the gripping-fingers, the tearers will not tear the material which will be wound upon the tearer drum in endless confusion unless the machine is stopped.

In the present instance the inner edge or right hand side of the material $a$ which is engaged by the gripping-fingers 19 is adapted to pass over an electrical contact-plate 155 secured to the surface of the table 35, said contact plate having a suitable binding post 156 which projects beyond the underside of the table. To one side and slightly in the rear of the contact-plate 155 and adapted to electrically engage the same, is a contact arm 157 pivoted to a bearing block 158 secured to the table 35 by means of a binding post 159.

When the material $a$ is in its proper position on the table 35 the edge of the material will keep the contact arm 157 out of electrical contact with the contact plate 155, but as soon as the material moves out of its proper position the contact arm will fall upon the contact-plate 155 to close an electrical circuit which acts to operate an electrical shifting device to stop the machine.

In the present instance the electrically controlled shifting device comprises a bracket 160 secured at one end to the shifting rod 152. On the free end of the bracket 160 is rotatably mounted an eccentric disk 161, faced with leather or similar substance 162 which is adapted to engage at certain times a friction disk 163 secured to the power shaft 55. To the underside of the bracket 160 is secured in a suitable bracket 164 an electro-magnet 165 which is adapted to electrically operate a hooked shaped armature 166 pivoted at one end to the bracket 160 by means of a pin 167 which supports a spring 168 arranged to keep the hooked end of the armature out of engagement with the magnet 165, when the magnet is deënergized. When the magnet 165 is deënergized the hooked shaped armature 166 is adapted to engage the free end of a stop arm 169 secured to the eccentric disk 161 which acts to hold the eccentric disk out of engagement with the friction disk 163. The stop arm 169 is kept in engagement with the hooked shaped armature 166 by means of a spring 170 one end of which is secured to a pin 171, secured to the eccentric disk 161 whereas the other end of the spring 170 is secured to a pin 172 secured to the bracket 160. The magnet 165 and the binding post 159 are connected in series with a suitable battery 173 through the medium of the wires 174 and 175. The magnet 165 is also connected to the binding post 156 through the medium of the wire 176 the movable contact 177 and the wire 178.

From the above description it will be seen that when in the operation of the machine the material $a$ gets out of alinement and moves off the contact plate 155 the contact arm 157 will electrically engage the same to energize the magnet 165 which acts to withdraw the hooked shaped armature 166 out of engagement with the stop arm 169 against the action of the spring 168. As soon as the stop arm 169 is released the spring 170 acts to force the eccentric disk 161 into engagement with the lower side of the friction disk 163 which acts to move the shifting rod 152 to shift the belt 174 onto the idle portion of the wheel 76 and stop the machine. The movement of the shifting rod 152 also acts to open the movable contact 177 one portion of which is secured to the shifting rod, the other portion of the contact being secured to an under table 179. The breaking of the contact 177 deënergizes the magnet 165 and the action of the spring 168 forces the hooked end of the armature 166 into position to again engage the stop 169 when the eccentric disk 161 has made one revolution.

When the machine has been automatically stopped as above described, the material $a$ is again placed in proper position on the contact plate 155 so as to be insulated from the contact arm 157, the hand lever 150 is then operated to move the shifting rod 152 and with it the belt 154 back on the tight wheel 76 to start the machine. The shifting of the rod 152 to start the machine also closes the contact 177 the different parts of the automatic shifting device now being in position to again stop the machine if the material $a$ leaves the contact plate 155 as before described.

While the invention has been described with particular reference to the details of construction, the same is not to be considered as limited thereto, as many changes can be made and still fall within the scope of the invention set forth in the following claims.

What I claim is:

1. A tearing machine comprising in combination a cylindrical tearer-drum, a tearer-carriage secured to said cylindrical tearer-drum, a tearer movably mounted on said tearer-carriage, means for rotating said cylindrical tearer-drum and means for moving said tearer.

2. A tearing machine comprising in combination a cylindrical tearer-drum, a plurality of tearer-carriages secured to said cylindrical tearer-drum, a tearer movably mounted on each tearer-carriage, means for rotating said cylindrical tearer-drum, and means for moving each of said tearers.

3. A tearing machine comprising in combination a cylindrical tearer-drum, a plurality of tearer-carriages secured to said tearer-drum at least one tearer movably mounted on at least one of said tearer-carriages, means for rotating said cylindrical tearer-drum, and means for moving at least one tearer.

4. A tearing machine comprising in combination a tearer-drum, a plurality of tearer-carriages secured to said tearer-drum, gripping fingers secured to each of said tearer-carriages, a tearer movably mounted on each of said tearer-carriages, means for rotating said tearer-drum, means for operating said gripping fingers, and means for moving said tearers.

5. A tearing machine comprising in combination a cylindrical tearer-drum, a plurality of tearer-carriages secured to said cylindrical tearer-drum, a tearer movably mounted on each tearer-carriage, means for rotating said cylindrical tearer-drum and means located in the interior of said tearer-drum for moving said tearers.

6. A tearing machine comprising in combination a tearer-drum, a plurality of tearer-carriages secured to said tearer-drum, gripping fingers secured to each of said tearer-carriages, a tearer movably mounted on each of said tearer-carriages, means for rotating said tearer-drum and a plurality of cams located in the interior of said tearer-drum for operating said gripping fingers and moving said tearers.

7. A tearing machine comprising a continuously rotating cylindrical tearer-drum having means on its circumference for gripping material to be torn, in combination with tearing means movable across such material so held.

8. A tearing machine comprising a continuously rotating cylindrical tearer-drum having means on its circumference for gripping material to be torn, in combination with tearing means movable across such material so held comprising a tearer movable transversely across the material, and means for so moving said tearer.

9. A tearing machine comprising a continuously rotating cylindrical tearer-drum having means on its circumference for gripping material to be torn, in combination with tearing means movable across such material so held comprising a tearer movable transversely across the material, means for so moving said tearer, and means for returning said tearer to its original position.

10. A tearing machine comprising a continuously rotating cylindrical tearer-drum having a plurality of means situated about its circumference for gripping material to be torn, in combination with a plurality of tearing means also situated about the circumference of said tearer-drum, and movable across such material so held.

11. A tearing machine comprising a continuously rotating cylindrical tearer-drum having a plurality of means situated about its circumference for gripping material to be torn, in combination with a plurality of tearing means also situated about the circumference of said cylindrical tearer-drum and movable across such material so held comprising a plurality of tearers movable across the material, and means for so moving said tearer.

12. A tearing machine comprising a continuously rotating cylindrical tearer-drum having a plurality of means situated about its circumference for gripping material to be torn, in combination with a plurality of tearing means also situated about the circumference of said cylindrical tearer-drum and movable across such material so held comprising a plurality of tearers movable across the material, means for so moving said tearers, and means for returning said tearers to their original position.

13. A tearing machine comprising a continuously rotating cylindrical tearer-drum having means on its circumference for gripping the material to be torn, in combination with tearing means movable across such material so held, and means for controlling the length of material between successive tearing means.

14. A tearing machine comprising a continuously rotating cylindrical tearer-drum having a plurality of means situated about its circumference for gripping material to be torn, in combination with a plurality of tearing means also situated about the circumference of said cylindrical tearer-drum and movable across such material and a plurality of spacing devices on said cylindrical tearer-drum for controlling the length of material between successive tearing means.

15. A tearing machine comprising a continuously rotating-tearer-drum having a plurality of means situated about its circumference for gripping material to be torn, in combination with a plurality of tearing means also situated about the circumference of said tearer-drum and movable across such material, a plurality of spacing devices on said tearer-drum for controlling the length of material between successive tearing means, means for moving said tearing means transversely across the material and returning them to their original position and means for moving said spacing devices into position and returning them to their original retracted position.

16. A tearing machine comprising in combination a tearing mechanism for tearing material transversely into separate pieces, and means for engaging the separated pieces of material as they are torn and conveying them away from said tearing mechanism.

17. A tearing machine comprising in combination a tearing mechanism for tearing material transversely into separate pieces, means for engaging the separate pieces of material as they are torn and conveying them away from said tearing mechanism, and means for piling said torn pieces of material.

18. A tearing machine comprising in combination a tearing mechanism for tearing material transversely into separate pieces, means for engaging the separate pieces of material as they are torn and conveying them away from said tearing mechanism, a pile receiver, and means for piling said torn pieces of material on said pile receiver.

19. A tearing machine comprising in combination a tearing mechanism for tearing material, a piling device, gripping means on said piling device arranged to grip the material as it is torn, and means for moving said piling device to convey the torn material away from said tearing mechanism.

20. A tearing machine comprising in combination a tearing mechanism for tearing material, a piling device, gripping means on said piling device arranged to grip the material as it is torn, means for moving said piling device to convey the torn material away from said tearing mechanism, and means for removing the torn material from said piling device.

21. A tearing machine comprising in combination a tearing mechanism for tearing material, a piling device, gripping means on said piling device arranged to grip the material as it is torn, a pile receiver, means for moving said piling device to convey the torn material away from said tearing mechanism, and means for removing the torn pieces of material from said piling device and piling them on said pile receiver.

22. A tearing machine comprising in combination a tearing mechanism for tearing material transversely into separate pieces, a pile receiving device, and means for engaging the separate pieces of material as they are torn and conveying them to said pile receiving device.

23. A tearing machine comprising in combination a tearing mechanism for tearing material, a pile receiving device, and means comprising a plurality of grippers for engaging the material as it is torn and conveying it to said pile receiving device.

24. A tearing machine comprising in combination a tearing mechanism for tearing material transversely into separate pieces, a piling bar and means for engaging the separate pieces of materials as they are torn and piling them on said piling bar.

25. A tearing machine comprising in combination a tearing mechanism for tearing material, a piling drum comprising a plurality of piling-bars, means for engaging the material as it is torn and piling it on one of the piling bars of said piling-drum and means for turning said piling-drum.

26. A tearing machine comprising in combination a tearing mechanism for tearing material, a piling-drum comprising a plurality of piling-bars means for engaging the material as it is torn and piling it on one of said piling bars, and means for turning said piling-drum to present a new piling-bar after a certain number of pieces of torn material have been piled on said piling bar.

27. A tearing-machine comprising in combination a tearer-carriage, a tearer movably mounted on said tearer-carriage, means on said tearer-carriage, for holding material to be torn, a piling device, and means on said tearer-carriage for forcing the material into engagement with said piling device.

28. A tearing machine comprising in combination a tearer-carriage, a tearer movably mounted on said tearer-carriage, means on said tearer-carriage for holding material to be torn, a piling device, and a ridge-plate on said tearer-carriage for forcing the material into engagement with said piling device.

29. A tearing machine comprising in combination a tearer-carriage, a tearer movably mounted on said tearer-carriage, means on said tearer-carriage for holding material to be torn, a piling device, comprising a gripper and means on said tearer carriage for forcing the material into engagement with said gripper.

30. A tearing machine comprising in combination a tearer-drum, a plurality of tearer-carriages secured to said tearer-drum, a tearer movably mounted on each of said tearer-carriages, means on said tearer-carriages for holding material to be torn, a piling device comprising a plurality of grippers and means on said tearer-carriages for forcing the material into engagement with the grippers of said piling device.

31. A tearing machine comprising in combination a tearer-drum, a plurality of tearer carriages secured to said tearer drum, a tearer movably mounted on each of said tearer carriages, means on said tearer carriages for holding material to be torn, a piling device comprising a plurality of grippers, one for each tearer carriage, and means on said tearer carriages for forcing the material into engagement with each of said grippers.

32. A tearing machine comprising in combination a tearer-drum, a tearer-carriage secured to said tearer-drum, a tearer for tearing material to be torn movably mounted on said tearer carriage, means for rotating said tearer drum, a piling device comprising a gripper adapted to engage said tearer carriage during a portion of the rotation of said tearer-drum for engaging and removing the torn material.

33. A tearing machine comprising in combination a rotatable tearer-drum, a tearer carriage secured to said tearer-drum, a tearer for tearing material to be torn movably mounted on said tearer carriage, a piling device comprising a gripper adapted to engage said tearer-carriage during a portion of the rotation of said tearer-drum for engaging and removing the torn material and means for rotating said tearer-drum and moving said grippers.

34. A tearing machine comprising in combination a rotatable tearer-drum, a tearer-carriage secured to said tearer-drum, a tearer for tearing material to be torn movably mounted on said tearer-carriage, a piling device comprising chain members, a gripper secured to said chain members, and adapted to engage said tearer-carriage during a portion of the rotation of said tearer-drum for engaging and removing the torn material, and means for operating said chain members to rotate said tearer-drum and move said gripper.

35. A tearing machine comprising in combination a rotatable tearer-drum, a tearer-carriage secured to said tearer-drum, a tearer for tearing material to be torn movably mounted on said tearer-carriage, a ridge-plate mounted on said tearer-drum, a piling device comprising a gripper adapted to engage said ridge-plate, means for operating said ridge-plate and means for operating said gripper for engaging said torn material.

36. A tearing machine comprising in combination a rotatable tearer-drum, a tearer-carriage secured to said tearer-drum, a tearer for tearing material to be torn movably mounted on said tearer - carriage, a ridge plate mounted on said tearer-drum, means for rotating said tearer-drum, a piling device comprising a gripper adapted to engage said ridge-plate for a portion of a revolution of said tearer-drum and means for operating said ridge plate and means for operating said gripper for engaging said torn material during said portion of a revolution said gripper is in contact with said ridge-plate.

37. A tearing machine comprising in combination a tearing mechanism, comprising means for engaging material to be torn, means for operating said tearing mechanism, and means for stopping said tearing mechanism when the material is not engaged by said material engaging means on said tearing mechanism.

38. A tearing machine comprising in combination a tearing mechanism, comprising means for engaging material to be torn, means for operating said tearing mechanism, and an automatic stop device for stopping said tearing mechanism when the material is not engaged by said material engaging means on said tearing mechanism.

39. A tearing machine comprising in combination a tearing mechanism, comprising means for engaging material to be torn, means for operating said tearing mechanism, and an electrically controlled stop device for stopping said tearing mechanism when the material is not engaged by said material engaging means on said tearing mechanism.

In testimony whereof I have signed this specification in the presence of two subscribing witnesses.

THOMAS ALLATT.

Witnesses:
LEO J. MATTY,
PAUL H. FRANKE.

Copies of this patent may be obtained for five cents each, by addressing the "Commissioner of Patents, Washington, D. C."